United States Patent [19]

Fish et al.

[11] 4,314,780

[45] Feb. 9, 1982

[54] TUBULAR KEY DUPLICATING MACHINE

[75] Inventors: Aaron M. Fish, Hampstead, Canada; Joseph H. Schlessel; Seymour B. Minski, both of Rocky Mount, N.C.

[73] Assignee: Unican Security Systems Corporation, Rocky Mount, N.C.

[21] Appl. No.: 120,731

[22] Filed: Feb. 11, 1980

[51] Int. Cl.³ .............................................. B23C 1/16
[52] U.S. Cl. ...................................... 409/81; 279/1 S
[58] Field of Search ............................ 409/81, 82, 83; 279/1 S; 76/110

[56] References Cited

U.S. PATENT DOCUMENTS

| | | | | |
|---|---|---|---|---|
| 1,188,667 | 6/1916 | Lymburner | ...................... | 279/15 X |
| 2,129,087 | 9/1938 | George et al. | ........................ | 409/82 |
| 3,495,482 | 2/1970 | Simon | ............................... | 409/81 X |
| 4,203,693 | 5/1980 | Schwartz et al. | ..................... | 409/81 |

Primary Examiner—Z. R. Bilinsky
Attorney, Agent, or Firm—Ira Milton Jones

[57] ABSTRACT

A chuck for a tubular key blank is mounted on one end of a plunger which is reciprocatable towards and away from an end mill, and which is also rotatable between a plurality of angularly-spaced positions. An original key is used to reciprocate the plunger so as to push the periphery of the blank into the end mill for distances corresponding to the lengths of notches on the original key, and to turn the plunger to selected angular positions corresponding to the angular disposition of the notches.

3 Claims, 7 Drawing Figures

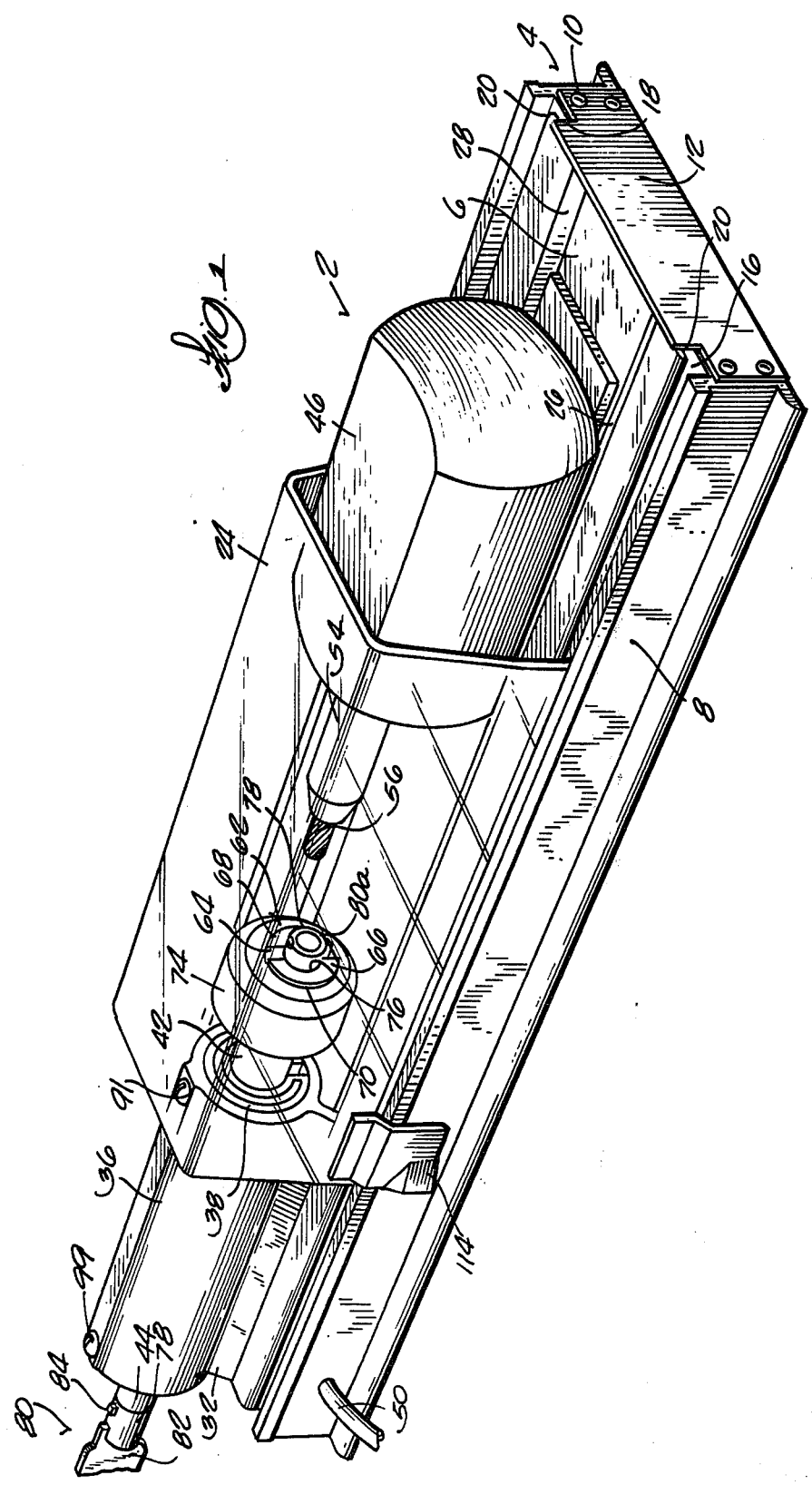

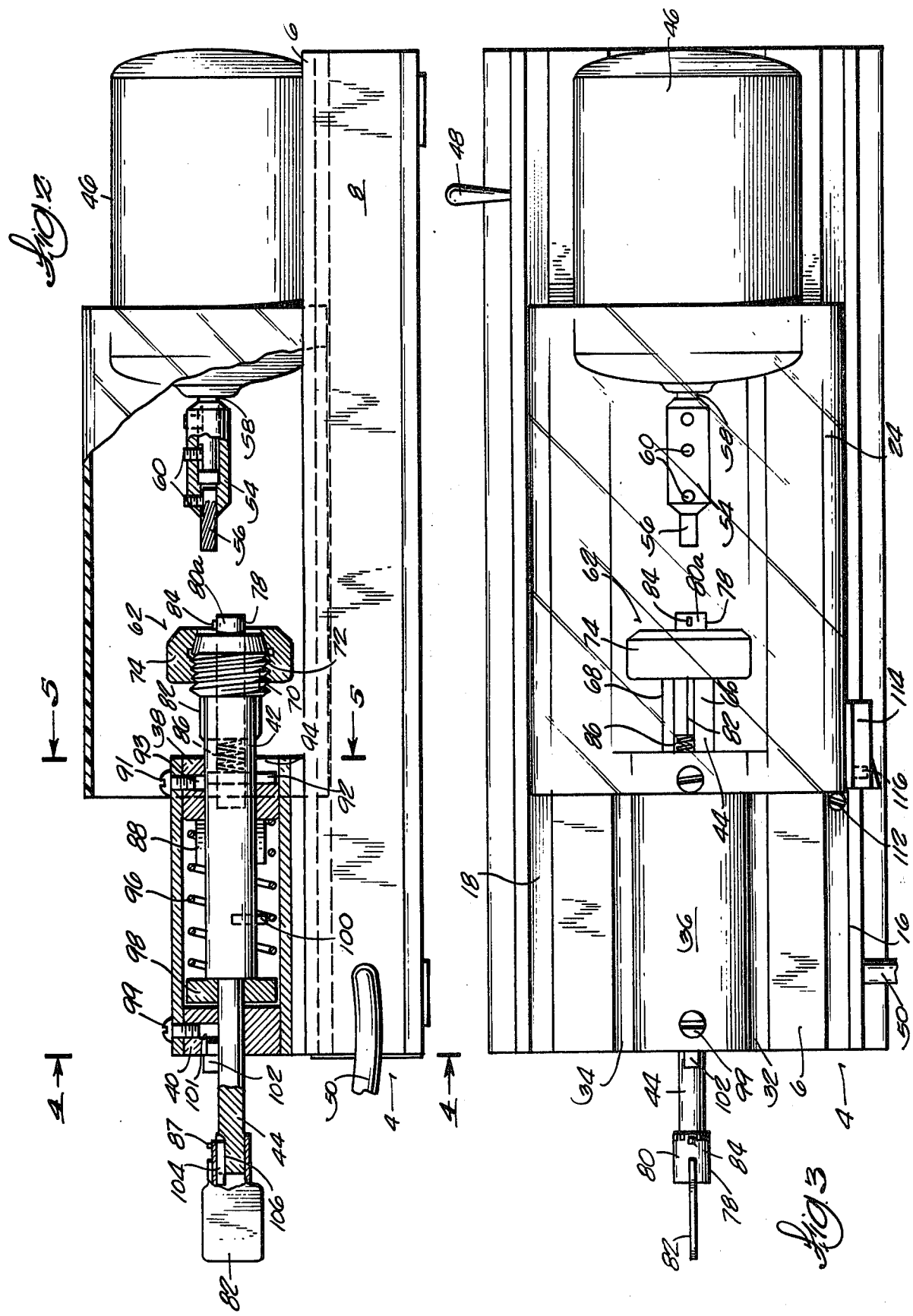

TUBULAR KEY DUPLICATING MACHINE

FIELD OF INVENTION

Gear cutting, Milling or planing, to cut lock key

PRIOR ART

U.S. Pat. Nos. to Caron 1,978,009; George et al. 2,128,087; Brand 3,418,882; Simon 3,495,482; and Kotov et al. 3,818,798.

BACKGROUND

In a typical tubular key there is an index element, which may an outwardly extending finger adjacent the open end of the barrel, and a series of notches arranged at predetermined minimal angular distances from the index element around the outer periphery of the barrel, and which extend for predetermined length from the barrel end. The arrangement of the notches determines whether the key will fit a particular lock, and the width, depth and length of the notches are critical, as is their angular spacing from one another. Virtually zero tolerances are essential, and since the duplicating machine must be easy to adjust and operate by relatively unskilled persons, it must be extremely simple, rugged and not prone to get out of adjustment.

While tubular key duplicating machines have previously been devised, so far as is known they have entailed the interposition of some sort of mechanism or moving parts between the original key and the blank. Any such mechanism either complicates the machine or militates against complete accuracy, or both. In the Simon patent (supra) for example, the holder for an original key is coupled to the holder of the blank via a gear train so that the fidelity with which the blank follows the rotating movements of the original depends upon the amount of backlash in the gear train, bearing tolerances and accuracy. In other machines, the key blank chuck is angularly indexed from one notching-position to another which are selected by the operator, sometimes according to a code, so that it is possible to cut notches in the blank which do not correspond to those in the original key.

OBJECTS AND SUMMARY

The primary object of this invention is to provide a simple tubular key duplicating machine which is capable of virtually perfect fidelity and complete accuracy in operation, and which, when once set up, requires practically no judgment on the part of the operator in the selection of the locations of the notches to be cut in the blank, or of the length, width and depth of the notches. To this end it is intended now to provide a reciprocating plunger on one end of which is a key blank chuck, and on to the other end of which is mounted an original key. Pushing the original key forwardly so as to engage a notch thereon onto an index pin advances the blank into an end mill for a distance corresponding to the length of a notch in the original key, and at an angular position corresponding to that notch in the original key; and rotation of the original from one notch position to another correspondingly rotates the blank. A slot on the original key mounting into which a key pin on the original key engages assures proper angular disposition of the original key on the key mounting, and a slot in the plunger support and a key pin on the plunger assure proper angular disposition of the plunger in the plunger support when the latter is in its retracted position.

In addition to the foregoing, it is also intended to provide a cylindrical template with slots of the same number and same angular spacing as the positions which may be occupied by notches on any original key, together with a slot follower pin on the plunger. These assure that notches can be milled in the key blank only at those angular positions where notches should be.

These and other objects will be apparent in the following specification and drawings, in which:

FIG. 1 is a perspective view of the tubular key duplicating machine with a blank installed in the chuck and an original key in place on its mounting;

FIG. 2 is a side elevation, broken away to show parts in cross section, of the machine shown in FIG. 1;

FIG. 3 is a plan view of the machine shown in FIGS. 1 and 2;

Figure 4:
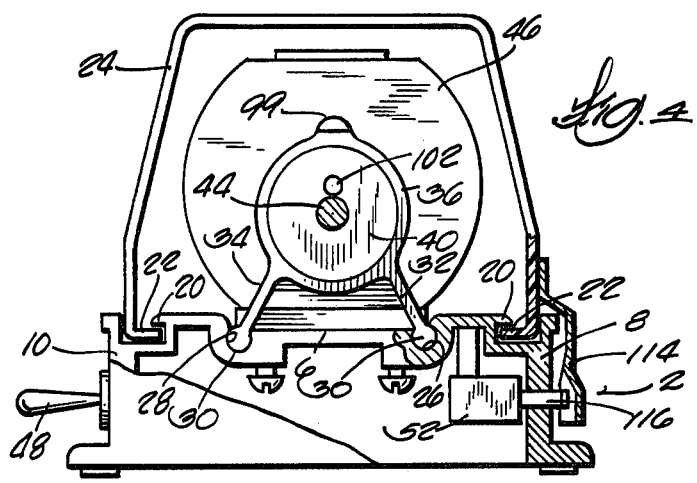
FIG. 4 is a vertical cross section along the lines 4—4, looking in the direction of the arrows.

Referring now to the drawings, in which like reference numerals denote similar elements, the tubular key cutting machine 2 has a chassis 4 which is an elongate shell 4 of inverted U shape with a top 6 and depending legs 8 and 10, one along each side. The ends of the chassis are closed by removable end plates 12 and 14. Running along the chassis top 6 near its longitudinal edges are ways 16 and 18 which have overhanging ledges 20 which overlie flanges 22 along the edges of a sliding transparent cover shell 24. Disposed inwardly of ways 16 and 18 are another pair of ways 26, 28 into which the rounded feet 30 on the legs 32, 34 of an elongate cylindrical plunger housing 36 engage. The feet are secured in these ways so the plunger support will not slide. Within housing 36 are secured bearings 38 and 40 which respectively support the cylindrical plunger 42 and the shaft 44 of reduced diameter which is a rearward extension of the plunger. Adjacent the other end of the chassis 4 is mounted a motor 46 controlled by an off-on switch 48 in an electric supply line 50, in which line is also connected a microswitch 52. The microswitch assures that the cover shell 24 will be in its operative position whenever key-cutting takes place. An adapter sleeve 54 mounts an end mill 56 on motor shaft 58, the shank of the end mill being secured in the adapter sleeve and the adapter sleeve being held fast on the motor shaft by set screws 60.

Figure 7:
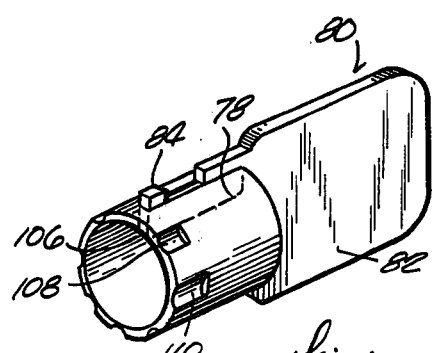
FIG. 7 is a perspective view of a typical notched tubular key.
Figure 5:
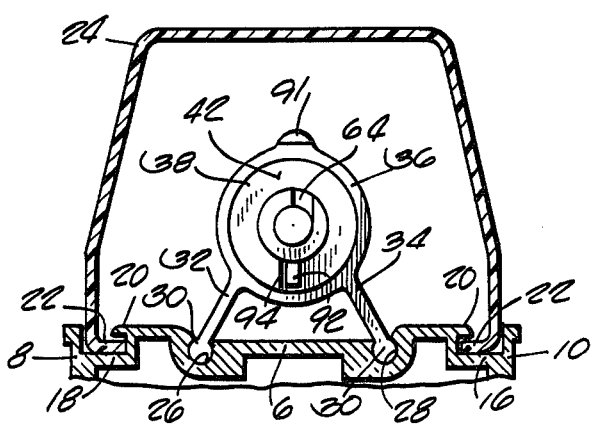
FIG. 5 is a fragmentary vertical cross section along the lines 5—5 of FIG. 2, looking in the direction of the arrows.

On the forward side of plunger 42 is a chuck, denoted generally by the arrow 62. The forward end of plunger 42 is divided by split 64 into a large segment 66 and a smaller segment 68 on the forward end of each of which are external threads 70 engaged by the internal threads 72 in a chuck nut 74. Along the inner side of the larger segment 66 runs a semi-cylindrical cavity 76 into which fits one side of the barrel 78 of a key blank 80a. An original key 80 is shown in FIG. 7. On its rear portion is a flat finger piece 82 which engages against the inner side of the larger segment 66 of the chuck. This assures that the angular position of the key blank will be correct when the blank is installed in the chuck. Installation is done by loosening the chuck nut 74 and inserting the key blank rearwardly into the split 64 between the chuck segments. A compression spring 86 which nests in the semicylindrical cavity 76 at the rear end of the chuck split 64 tends to urge the key blank forwardly when the chuck nut 74 is loosened. When the chuck nut is tightened, the chuck segments clamp against the key barrel 78.

Figure 6:
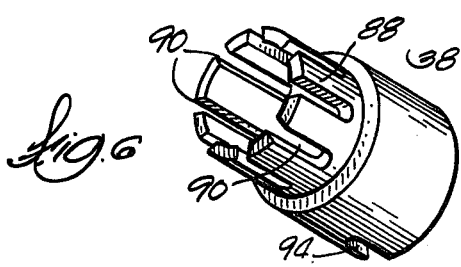
FIG. 6 is a perspective view of the index template removed from the machine.

Referring particularly to FIGS. 2 and 6, on the rear side of plunger bearing 38 is a template 88 constituted by rearwardly extending skirt having index slots 90 equally-angularly spaced around it. These slots correspond to the angular locations at which notches may be cut in the key blank. Bearing 38 is retained in a proper fixed position by a set screw 91 which engages into a hole 93 in its top. From the underside of plunger 42 projects a key pin 92 which moves into a slot 94 in the forward side of plunger bearing 38 when the plunger is indexed and retracted to a starting position. Plunger 42 is normally biased rearwardly by a compression spring 96 which fits around template 88 at its forward end and whose rear end engages against the stop collar 98 fixed on plunger shaft 44. An index pin 100 on plunger 44 engages in one or another of slots 90 in template 88, thereby assuring that the key blank can be advanced for notch milling only when it has been rotated to a position corresponding to where a slot should be.

Referring particularly to FIGS. 2, 3 and 4, shaft bearing 40 is fixed in the plunger housing by a set screw 99 which engages in a hole 101 in its top, and projecting from the rear side of shaft bearing 40 is an index pin 102. Extending lengthwise in the rear end of shaft 44 is a slot 104 into which a key projection 106 on the inner side of an original key barrel engages when the key barrel is properly fitted over the rear end of shaft 44. The object of all of the foregoing is to mill in the key blank 80a notches which correspond precisely in angular position, depth and length to the notches 108 and 110 in original key 80. This is done as follows:

An original key 80 is installed on the rear end of plunger shaft 44, chuck nut 74 is loosened, a key blank is inserted rearwardly into the split 64 of the chuck, and chuck nut 74 is slightly tightened. Engagement of the flat finger piece 82 of the key blank against the flat inner side of the larger segment 66, and engagement of the key projection 106 in the original key barrel into the slot 104 in shaft 44 assure that the angular orientation of the original key and the key blank on the plunger are identical. When the chuck nut is loose, compression spring 86 in the inner end of the chuck split 64 tends to push the key blank forwardly. The original key is used to advance the plunger until its front edge engages the index pin 102 on shaft bearing 40, and during the final advancing movement of the plunger, the cutting end of end mill 56 engages the forward edge of the key blank and forces the latter rearwardly against the compression of spring 86, and then chuck nut 74 is finally tightened. This predetermines the relative lengthwise positions of the key blank and the original key with respect to the length of the plunger and this, in turn, assures that the notches to be cut will be identical in length to the notches in the original key. The forward pressure on the original key is then released so that compression spring 96 retracts plunger 42 to its normal rearward position. Then, transparent cover shell 24 is slid until one of its flanges 22 engages a stop screw 112 in the bottom of way 16. In this position, the cover shell enshrouds the end mill and a striker plate 114 on the shell engages the plunger 116 of the microswitch 52 so that when switch 48 is turned on, the motor is energized and the end mill rotates. Thereafter, the original key is turned and advanced so that the notches 108 or 110 successively slide along index pin 102 until the latter abuts against the inner end of the particular notch in which it is engaged. The length of advance depends upon the length of the notch being milled in the original key.

After all of the notches in the original key 80 have been duplicated in blank 80a, transparent cover shell 24 is slid back, chuck nut 74 is loosened and compression spring 86 pushes the duplicate forwardly in the chuck so that it can be easily removed.

I claim:

1. A key cutting machine for duplicating in the barrel of a tubular key blank the notches in the barrel of an original key, comprising
a chassis,
an end mill mounted on said chassis,
a plunger having front and rear ends respectively disposed towards and away from the end mill, and having on said front end a chuck for holding the keys blank,
plunger support means mounting said plunger on said chassis for endwise advancing and retracting reciprocating movement between advanced and retracted positions, respectively along an axis towards and away from the end mill and for rotation about said axis,
a key mounting on the rear end of the plunger for coaxially engaging the open end of the barrel of the original key for rotation therewith,
original key notch-engaging locator means on said plunger support means for entering original key notches in registry therewith, whereby angular orientation of the original key so as to register a notch with the locator means identically orients the key blank angularly with respect to the end mill, and
cooperative indexing means on said plunger and plunger support means for indexing the plunger to a predetermined angular position in the retracted position thereof.

2. A key cutting machine for duplicating in the barrel of a tubular key blank the notches in the barrel of an original key, comprising:
a chassis,
an end mill mounted on the chassis,
a plunger having front and rear ends respectively disposed towards and away from the end mill, and having on said front end a chuck for holding the key blank,
plunger support means mounting said plunger on the chassis for endwise advancing and retracting reciprocating movement along an axis towards and away from the end mill and for rotation about said axis,
a key mounting on the rear end of the plunger for coaxially engaging the open end of the barrel of the original key for rotation therewith, original key notch-engaging locator means on said plunger support means for entering original key notches in registry therewith, whereby angular orientation of the original key so as to register a notch with the locator means identically orients the key blank angularly with respect to the end mill, and advancing of the original key until the locator means engages the inner end of the registering notch identically advances the key blank with respect to the end mill, said original key being characterized by predetermined angular spacing between the notches in the barrel thereof, cooperating means on said plunger and plunger support means for angularly indexing the plunger about said axis to angular positions corresponding to the angular spacing of notches in the original key barrel, said cooperating means comprising a template affixed in the plunger support means and having a plurality of angularly spaced slots with open ends facing away from the end mill, and a notch follower means on said plunger for engaging in said slots.

3. The key cutting machine of claim 1, further characterized by:

said cooperating indexing means comprising a template affixed in the plunger support means and having a plurality of angularly spaced slots with open ends facing away from the end mill, and a notch follower means on the plunger for engaging in said slots.

* * * * *